(12) United States Patent
Jung et al.

(10) Patent No.: US 10,737,789 B2
(45) Date of Patent: Aug. 11, 2020

(54) PET TRAVEL SYSTEMS AND METHODS ON A VEHICLE

(71) Applicant: THE BOEING COMPANY, Chicago, IL (US)

(72) Inventors: Sun Min Jung, Lynnwood, WA (US); Amar Seta, Redmond, WA (US)

(73) Assignee: THE BOEING COMPANY, Chicago, IL (US)

( * ) Notice: Subject to any disclaimer, the term of this patent is extended or adjusted under 35 U.S.C. 154(b) by 369 days.

(21) Appl. No.: 15/860,252

(22) Filed: Jan. 2, 2018

(65) Prior Publication Data

US 2019/0202564 A1 Jul. 4, 2019

(51) Int. Cl.
*B64D 11/00* (2006.01)

(52) U.S. Cl.
CPC .................. *B64D 11/003* (2013.01)

(58) Field of Classification Search
CPC .......... B64D 11/003; B64D 2011/0069; A01K 1/0035
USPC ...................................................... 244/118.1
See application file for complete search history.

(56) References Cited

U.S. PATENT DOCUMENTS

| | | | | | |
|---|---|---|---|---|---|
| 2,897,781 | A | * | 8/1959 | Olson | A01K 1/0272 |
| | | | | | 119/496 |
| 5,335,618 | A | * | 8/1994 | Zarola | A01K 1/00 |
| | | | | | 119/497 |
| 5,931,120 | A | * | 8/1999 | Burns | A01K 1/0254 |
| | | | | | 119/497 |
| 7,665,420 | B2 | * | 2/2010 | Plante | A01K 31/06 |
| | | | | | 119/461 |
| 7,690,159 | B1 | * | 4/2010 | Arnold | A01K 1/0035 |
| | | | | | 52/167.1 |
| 9,247,711 | B2 | * | 2/2016 | Reginhard | A01K 1/0272 |
| 2009/0223463 | A1 | * | 9/2009 | Chem | A01K 1/034 |
| | | | | | 119/482 |
| 2016/0066535 | A1 | * | 3/2016 | Anderson | A01K 1/0245 |
| | | | | | 119/453 |
| 2016/0095290 | A1 | * | 4/2016 | Reginhard | A01K 1/0035 |
| | | | | | 119/496 |
| 2019/0031351 | A1 | * | 1/2019 | Roth | B29C 66/7212 |
| 2019/0106213 | A1 | * | 4/2019 | Minyard | B64D 11/0023 |
| 2019/0233112 | A1 | * | 8/2019 | Seta | B64D 11/003 |

FOREIGN PATENT DOCUMENTS

EP 3305662 A1 * 4/2018 ......... B64D 11/0606

* cited by examiner

*Primary Examiner* — Christopher P Ellis
(74) *Attorney, Agent, or Firm* — The Small Patent Law Group LLC; Philip S. Hof

(57) ABSTRACT

A vehicle includes a fuselage defining an interior cabin and a bunk within the interior cabin. The bunk has a base wall and a ceiling that extend a length of the bunk from a first end wall to a second end wall. The bunk includes one or more removable partition walls that divide the bunk into multiple pet compartments between the first and second end walls. The pet compartments are configured to contain pets therein. Each of the partition walls is removably secured to both the base wall and the ceiling.

20 Claims, 7 Drawing Sheets

# PET TRAVEL SYSTEMS AND METHODS ON A VEHICLE

FIELD OF EMBODIMENTS OF THE DISCLOSURE

Embodiments of the present disclosure generally relate to systems and methods of transporting pet animals onboard a vehicle, such as a commercial aircraft.

BACKGROUND OF THE DISCLOSURE

Many passengers on commercial aircraft desire traveling with their pets, such as dogs, cats, rabbits, hamsters, and birds. In order to transport a pet on a commercial vehicle, a passenger today typically has at most two options.

The first option is to transport the pet in a crate within a cargo area underneath the interior cabin where the passengers are located. Because the pet is in a cargo area with luggage, the cargo area may have uncomfortable conditions including dark lighting, hot and/or cold temperatures, loud noises, and the like, which may cause anxiety in certain pets. In addition to being uncomfortable, the fear and confusion of being in a different place without knowing where the pet's owner is may cause the pet to suffer anxiety. Furthermore, the pet's owner in the interior cabin may worry about the condition of the pet in the cargo area during the trip, elevating the anxiety of the owner and reducing the owner's enjoyment of the trip.

The second option that is only available for certain pets that meet specific restrictions (e.g., types of pet, sizes, behaviors, etc.) is to stow the pet within a bag under a passenger seat in the interior cabin for the duration of the trip. Assuming that a passenger's pet meets the strict criteria, stowing the pet in the cabin near the pet's owner may allay some fears and apprehensions of the owner. Still, the owner may worry that the pet may disturb other passengers, such as by making too much noise or by triggering allergy-related symptoms in other passengers. Also, although the ambient conditions within the interior cabin may be more comfortable than in the cargo area, the pet may still be uncomfortable due to being confined in a small bag or crate for several hours. Moreover, by stowing the pet in a bag underneath a seat, the available legroom for the passenger is reduced.

Accordingly, when traveling on a commercial vehicle with a pet today, the pet may experience mild to significant discomfort and/or anxiety, and the owner may also experience discomfort and/or anxiety, regardless of the pet being stowed in the cargo area or in the interior cabin underneath a seat.

SUMMARY OF THE DISCLOSURE

A need exists for a system and method for transporting pets onboard a vehicle, such as a commercial aircraft, that increase pet comfort and reduce owner passenger anxiety. A need exists for storing pets in an interior cabin of a vehicle without stowing the pets underneath passenger seats. A need exists for a system and method of providing amenities and services to pets traveling within an interior cabin of a vehicle to increase the comfort of the pets during the trip.

With those needs in mind, certain embodiments of the present disclosure provide a vehicle that includes a fuselage defining an interior cabin and a bunk within the interior cabin. The bunk has a base wall and a ceiling that extend a length of the bunk from a first end wall to a second end wall. The bunk includes one or more removable partition walls that divide the bunk into multiple pet compartments between the first and second end walls. The pet compartments are configured to contain pets therein. Each of the partition walls is removably secured to both the base wall and the ceiling.

Certain embodiments of the present disclosure provide a vehicle that includes a fuselage defining a main passenger cabin and an overhead cabin. The main passenger cabin extends vertically from a floor to a ceiling and includes passenger seats mounted to the floor. The overhead cabin is disposed above the ceiling of the main passenger cabin. The overhead cabin includes multiple bunks and an aisle for accessing the bunks. Each of the bunks has a respective base wall and a respective ceiling that extend a length of the bunk from a respective first end wall to a respective second end wall. At least a first bunk of the multiple bunks includes one or more removable partition walls that divide the first bunk into multiple pet compartments between the first and second end walls. The pet compartments are configured to contain pets therein.

Certain embodiments of the present disclosure provide a method for transporting a pet within a vehicle during a trip. The method includes installing one or more removable partition walls into a bunk within an interior cabin of a vehicle. The bunk extends a length between first and second end walls. The one or more partition walls are installed into tracks within the bunk that are spaced apart from the first and second end walls. The one or more partition walls divide the bunk into multiple pet compartments along the length of the bunk. The method includes transporting a pet into the interior cabin of the vehicle to the bunk, and loading the pet into one of the pet compartments of the bunk. The method also includes securing the pet within the corresponding pet compartment such that the pet is retained within the pet compartment during a trip of the vehicle.

DETAILED DESCRIPTION OF THE DISCLOSURE

Figure 1:
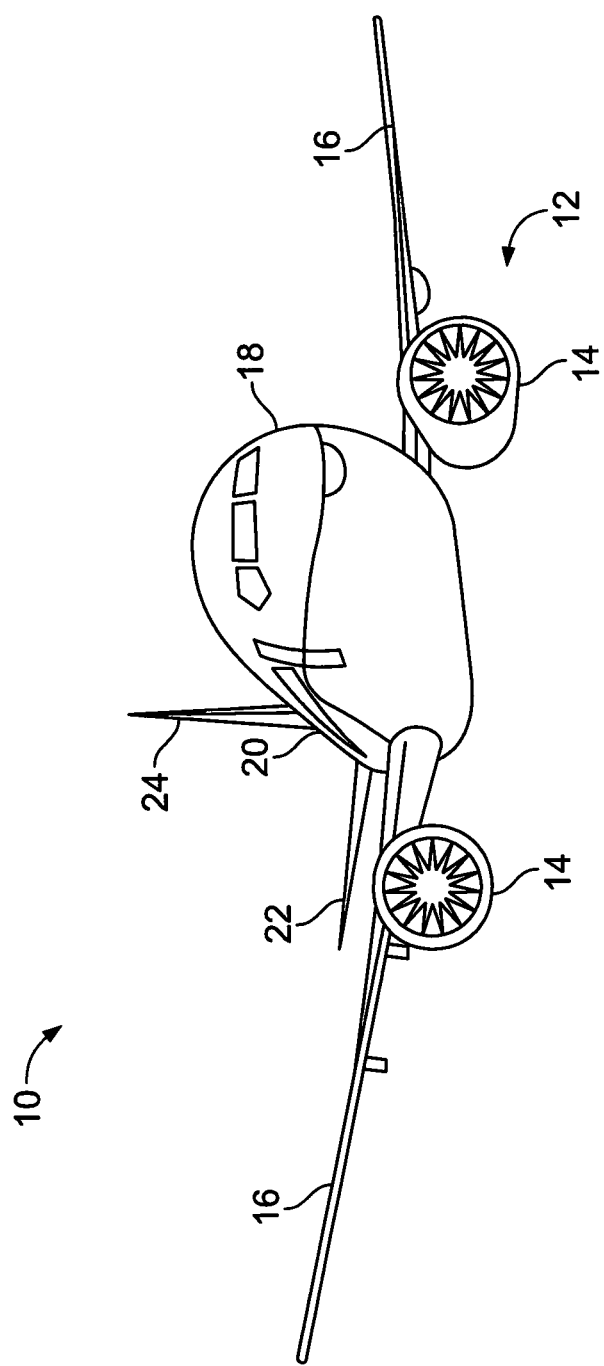
FIG. 1 illustrates a front perspective view of an aircraft, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Certain embodiments of the present disclosure include a vehicle that contains a pet-configurable bunk with removable partition walls in order to accommodate live pet animal storage during a trip of the vehicle. The pets may be dogs, cats, birds, rabbits, hamsters, lizards, or the like. The space within the bunk is configurable by selectively moving and/or removing the partition walls.

The bunk is configurable in different states based on the number and spacing of the partition walls installed within the bunk. When the bunk has no partition walls, the bunk may be used as a resting bunk for a human, such as a passenger or crew member of the vehicle. The bunk without partition walls may have a size and shape that is configured to comfortably accommodate an adult person lying prone. For example, the bunk may have a length that is greater than the height of at least 90% or at least 95% of male adult persons, such that most people can lie down within the bunk without having to bend their knees. When the bunk has one or more partition walls mounted therein, the bunk is configured for providing pet compartments for storing pets and/or cargo space for storing other items. The pet compartments of the bunk may be configurable in multiple different sizes based on the location and number of partition walls installed to provide a desired amount of space for a given pet to comfortably lay, stand, stretch, and/or walk within the pet compartment. Any pet compartments in the bunk that are not occupied by pets may be used for storing pet-related accessories and/or non-pet-related items, such as strollers, luggage, bags, car seats, coats, hats, umbrellas, and the like.

The pet compartments may be configured to receive self-contained pet storage modules therein, where one or more pets are housed within a corresponding pet storage module disposed in one of the pet compartments of the bunk. In an alternative embodiment, the partition walls and other structural walls of the bunk define a built-in pet storage suite within the pet compartment. For example, a partition wall may include a door that is hingedly connected to an inboard side of the partition wall. The door may be configured to close and latch to an adjacent partition wall and/or an end of the bunk to enclose the pet within the pet compartment, defining the built-in pet storage suite.

The vehicle may include a main passenger cabin in which the passengers sit during the trip. The bunk may be located in an area of the vehicle that is separate from the main passenger cabin. For example, the bunk may be located rearward (e.g., aft) of the main passenger cabin in a rear cabin or above the main passenger cabin in an overhead cabin. The pets that are housed within the pet compartments of the bunk are separated from the passengers in the main passenger cabin by walls or the like, which may shield the passengers from pet smells, pet-related allergens in the air, pet noises (e.g., barks), and the like. Therefore, as compared to storing a pet underneath a passenger seat within the main passenger cabin, storing pets within the pet-configurable bunk may provide less of an inconvenience or annoyance to other passengers in the vehicle (e.g., due to the lack of pet-related odors, sounds, allergens, etc.).

Furthermore, in one or more embodiments disclosed herein the pet-configurable bunk may be within a well-lit, temperature-controlled environment. For example, the pets within the pet-configurable bunk may be exposed to the same or similar temperature, lighting, and/or ventilation conditions as the passengers within the main passenger cabin. Therefore, as compared to storing a pet within a cargo bay of a vehicle (which may be dark, cold, and/or stagnant), storing pets within the pet-configurable bunk may be more comfortable and less stressful for the pets. Another difference between storing pets within the pet-configurable bunk according to the embodiments disclosed herein and storing pets within the cargo bay is that a pet within the pet-configurable bunk may be more accessible to the pet owner during the trip than a pet stored within the cargo bay. The owner of a specific pet may be allowed at certain times during the trip to leave the main passenger cabin and walk to the pet-configurable bunk to visit the pet. Additionally, or alternatively, the owner may be able to monitor the pet in the pet-configurable bunk without leaving the main passenger cabin through the use of an imaging device, such as a camera, that is mounted in an orientation to capture image data of the pet within the bunk.

The systems and methods of the present disclosure provide pet owners with a new option for pet travel on vehicles that is more comfortable for the pet than conventional pet travel options that include stowing the pets within the cargo area or under passenger seats. The pet-configurable bunk disclosed herein does not interfere with passenger-related operations in the main passenger cabin because the pet-configurable bunk is separate from the main passenger cabin and occupies the same space as a pre-existing rest bunk. The pet-configurable bunk makes efficient use of available space within the vehicle because the bunks may not be utilized for human resting during relatively short and/or daytime trips. The pet-configurable bunk may also be desirable for pet owners because the owners are able to check on their pets during a trip, either directly by walking up to the bunk or indirectly via a camera feed of the pet in the pet compartment of the bunk, without worrying about the condition and/or health of their pets underneath a passenger seat or within a cargo bay, and without worrying that the pet is a nuisance for other passengers. The systems and methods of the present disclosure also may provide commercial carriers (e.g., airlines, rail companies, etc.) with an additional revenue source by renting the space within the rest bunks for pet accommodations.

FIG. 1 illustrates a front perspective view of an aircraft 10 according to an embodiment of the present disclosure. The aircraft 10 includes a propulsion system 12 that may include two turbofan engines 14. Optionally, the propulsion system 12 may include more engines 14 than shown. The engines 14 are carried by wings 16 of the aircraft 10. In other embodiments, the engines 14 may be carried by a fuselage 18 and/or an empennage 20. The empennage 20 may also support horizontal stabilizers 22 and a vertical stabilizer 24. The fuselage 18 of the aircraft 10 defines an interior cabin.

Figure 2:
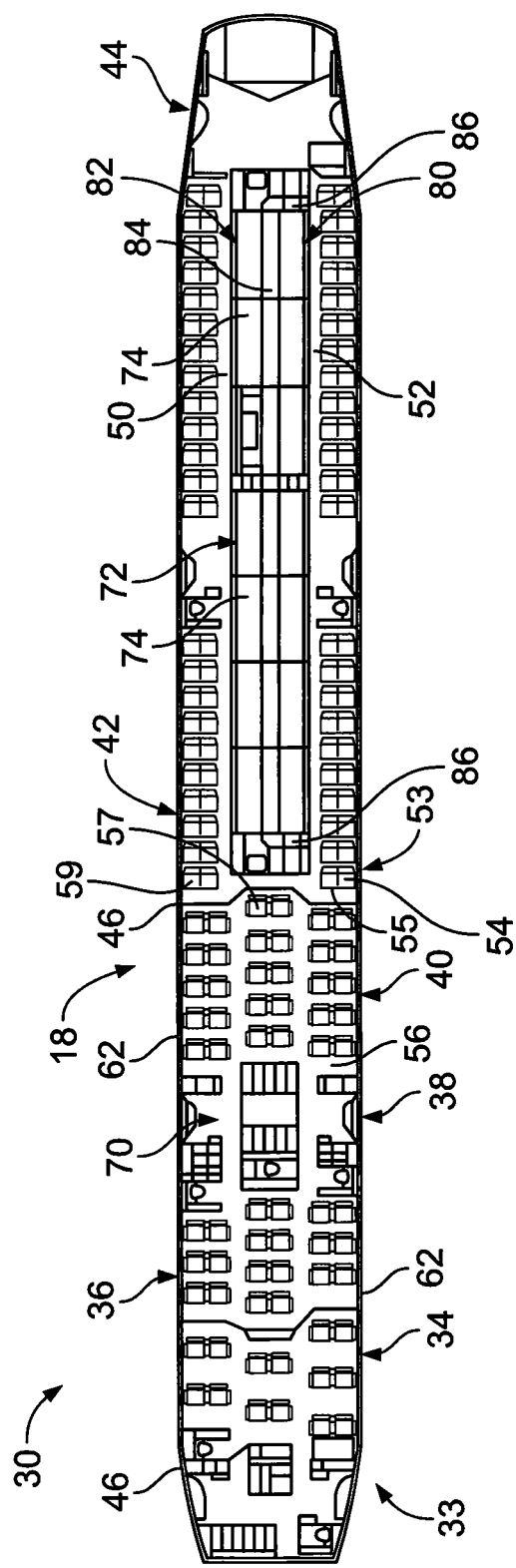
FIG. 2 illustrates a top plan view of an interior cabin of a vehicle, according to an embodiment of the present disclosure.

FIG. 2 illustrates a top plan view of an interior cabin 30 of the aircraft 10 (shown in FIG. 1) according to an embodiment of the present disclosure. The interior cabin 30 is within the fuselage 18. For example, one or more fuselage wall members 62 may define the interior cabin 30. In the illustrated embodiment, the interior cabin 30 includes a main passenger cabin 70 and an overhead cabin 72. The main passenger cabin 70 may have multiple sections or zones, including a front section 33, a first class section 34, a business class section 36, a front galley station 38, a business section 40 (e.g., an expanded economy or coach section), a standard economy or coach section 42, and an aft section 44, which may include lavatories and/or galley stations. It is to be understood that the main passenger cabin 70 may include more or less sections and zones than shown. For example, the main passenger cabin 70 may not include a first class section, and may include more or less galley stations than shown. Each of the sections may be separated by a cabin transition area 46, which may include divider assemblies. Overhead stowage bin assemblies may be positioned throughout the interior cabin 30.

As shown in FIG. 2, the main passenger cabin 70 includes two aisles 50 and 52 that lead to the aft section 44. Optionally, the main passenger cabin 70 may have less or more aisles than shown. For example, the main passenger cabin 70 may include a single aisle that extends through the center of the main passenger cabin 70 that leads to the aft section 44. The main passenger cabin 70 includes rows 53 of seats 54 that span across the interior cabin 30 and generally extend across the aisles 50 and 52. Columns 55, 57, and 59 of seat sections extend perpendicular to the rows 53. Each seat section may include one or more seats 54 that are mounted to a floor 56 of the main passenger cabin 70. The columns 55, 57, and 59 generally run parallel with the aisles 50 and 52. A particular section or zone may include any number of columns 55, 57, and 59 of seat sections. As shown in FIG. 2, at least one zone includes three columns 55, 57, and 59 of seat sections. However, each zone may include more or less than three columns.

In the illustrated embodiment, the overhead cabin 72 is disposed vertically above a portion of the main passenger area 70. For example, although not shown in FIG. 2, the main passenger area 70 may be disposed vertically between the overhead cabin 72 above, and a cargo bay and landing gears of the vehicle 10 below. The overhead cabin 72 may be discrete and separate from the main passenger cabin 70, such that the overhead cabin 72 is disposed above a ceiling and overhead storage bins of the main passenger cabin 70. In the illustrated embodiment, the overhead cabin 72 aligns with the coach section 42 of the main passenger cabin 70. For example, the coach section 42 may include a middle column 57 of passenger seats 54 disposed between the two aisles 50, 52 that is obstructed from view in FIG. 2 by the overhead cabin 72 that is vertically above the middle column 57. In an alternative embodiment, the overhead cabin 72 may align vertically over a different area of the interior cabin 30 (instead of or in addition to aligning with the coach section 42), such as the aft section 44, the business section 40, and/or the front section 33.

The overhead cabin 72 includes multiple bunks 74. The bunks 74 may be designed to allow people to lie down within the bunks 74 during long trips. The bunks 74 may be accessible to the vehicle crew (e.g., pilots, attendants, or the like) and/or the passengers. The bunks 74 are arranged in a first column 80 and a second column 82, with an aisle 84 disposed therebetween. The interior cabin 30 also includes at least one access enclosure 86 that allows people to move between the main passenger cabin 70 and the overhead cabin 72. In the illustrated embodiment, there are two access enclosures 86 that are located at opposite ends of the overhead cabin 72 (e.g., at the ends of the aisle 84). The two access enclosures 86 provide two points of exit from the overhead cabin 72. Each of the access enclosures 86 may include a ladder, stairs, an elevated lift, and/or the like for ascending and descending between the two cabins 70, 72.

In one or more embodiments, at least some of the bunks 74 are pet-configurable bunks 74 that are configured to receive one or more partition walls 126 (shown in FIG. 3) for segmenting the respective bunk 74 into multiple pet compartments 128 (FIG. 3) configured to accommodate pets therein during a trip. The overhead cabin 72 is shown in more detail in FIG. 3. It is recognized that the embodiments of the pet-configurable bunks 74 described herein are not limited to being located within the overhead cabin 72 above the main passenger cabin 70. For example, in an alternative embodiment, one or more of the bunks 74 may be located within the front section 33, the aft section 44, or the like, of the main passenger cabin 70. The bunks 74 within the main passenger cabin 70 may be separated from the general population of passengers via the cabin transition areas 46 to limit pet noises and smells from disturbing the passengers.

Although the vehicle 10 shown and described in FIGS. 1 and 2 is an aircraft, a commercial aircraft is one non-limiting example embodiment or application of the inventive subject matter described herein. Embodiments of the present disclosure may be used with various other vehicles, such as automobiles, buses, rail vehicles (e.g., locomotives and train cars), seacraft, spacecraft, vehicles that move within reduced-pressure tubes, and the like. For example, in a rail vehicle, one or more of the pet-configurable bunks 74 disclosed herein may be mounted within a rail car that is designated for sleeping and/or pets.

Figure 3:
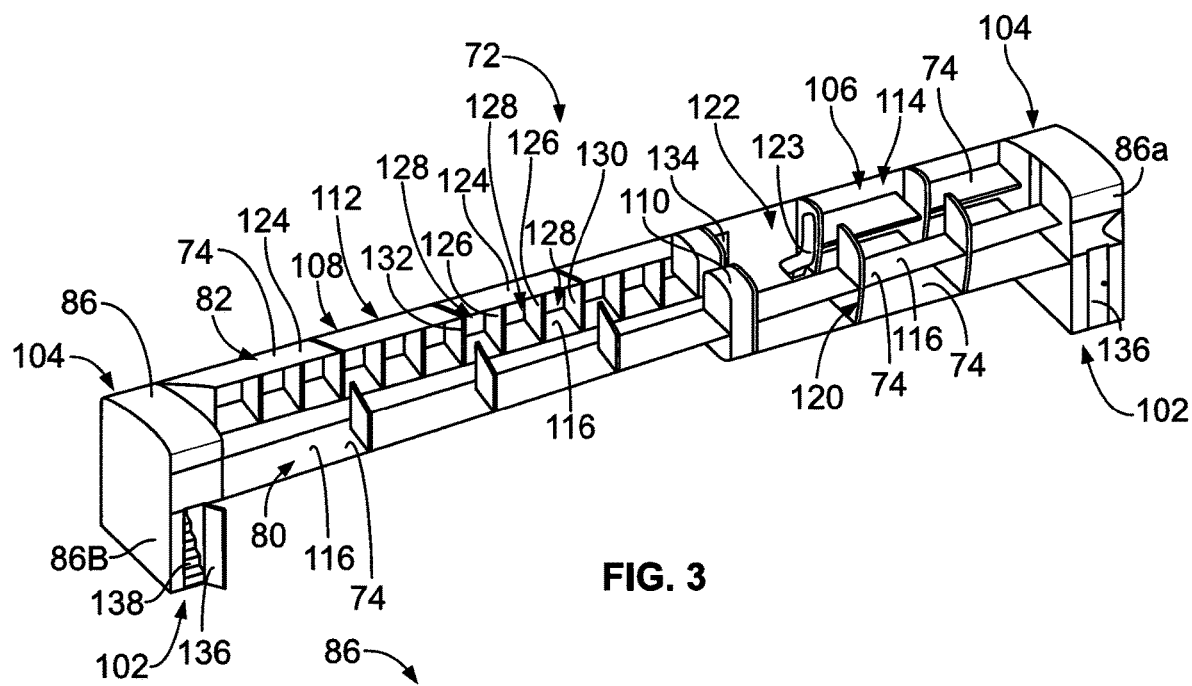
FIG. 3 is a top perspective view of an overhead cabin and access enclosures of the interior cabin of the vehicle, according to an embodiment of the present disclosure.

FIG. 3 is a top perspective view of the overhead cabin 72 and the access enclosures 86 of the interior cabin 30 (shown in FIG. 2) according to an embodiment of the present disclosure. Each of the access enclosures 86 extends from a bottom end 102 to a respective top end 104. Although not shown in FIG. 3, the bottom ends 102 are disposed on the floor 56 (FIG. 2) of the interior cabin 30, and the top ends 104 project beyond a ceiling (not shown) of the main passenger cabin 70 (FIG. 2). The overhead cabin 72 is suspended between upper portions of the access enclosures 86 at or proximate to the top ends 104. The overhead cabin 72 is spaced apart vertically from the bottom ends 102 of the access enclosures 86, which allows the overhead cabin 72 to extend above the main passenger cabin 70. Each of the access enclosures 86 includes a door 136 that opens to reveal a ladder or staircase 138. A person may enter the overhead cabin 72 by climbing the ladder or staircase 138.

In the illustrated embodiment, the overhead cabin 72 is segregated into a rest compartment 106 and a pet storage compartment 108. The rest compartment 106 is separated from the pet storage compartment 108 by a septum wall 110. Both the rest compartment 106 and the pet storage compartment 108 include bunks 74. For example, the pet storage compartment 108 may contain a first subset 112 of bunks 74, and the rest compartment 106 may contain a second subset 114 of bunks 74. The first and second subsets 112, 114 optionally may represent the total number of bunks 74 on the vehicle 10. In an embodiment, all of the bunks 74 in both compartments 106, 108 are designed to accommodate adult persons lying prone (e.g., lying down). For example, the bunks 74 may each include a planar base wall 116 on which a cushion, mattress, or the like may be placed. A person may lay on the base wall 116 on top of the cushion to rest (e.g., sleep, read, or the like).

Optionally, the bunks 74 in the first subset 112 within the pet storage compartment 108 are arranged differently than the bunks 74 in the second subset 114 within the rest compartment 106. For example, in the illustrated embodiment, the pet storage compartment 108 includes eight total bunks 74 with each of the two columns 80, 82 having four bunks 74 arranged end-to-end along a length of the pet storage compartment 108. The rest compartment 106 includes ten total bunks 74 with the bunks 74 stacked in pairs 120. For example, the first column 80 includes six bunks 74 arranged in three pairs 120 along the length of the rest compartment 106, and the second column 82 includes four bunks 74 arranged in two pairs 120. The rest compartment 106 in the illustrated embodiment also includes a sitting area 122 that is aligned with the second column 82 of bunks 74. The sitting area 122 includes at least one lounge chair 123. It is recognized that the number and arrangement of the bunks 74 in the illustrated embodiment represents a non-limiting, example embodiment, and that other embodiments of the overhead cabin 72 may include different numbers and/or arrangements of bunks 74 than the number and arrangement shown in FIG. 3. For example, all of the bunks 74 may be stacked, or none of the bunks 74 may be stacked. In addition, the overhead cabin 72 in an alternative embodiment may define only a single compartment, and therefore lacks the septum wall 110 that divides the overhead cabin 72 into the pet storage compartment 108 and the rest compartment 106.

In an embodiment, at least some of the bunks 74 in the first subset 112 within the pet storage compartment 108 are pet-configurable bunks 124 that are configured to receive one or more removable partition walls 126 therein to define multiple pet compartments 128 within the length of the bunk 124. For example, each of the bunks 124 extends a length between a first end wall 130 and a second end wall 132. The bunks 124 are selectively configurable by installing one or more of the partition walls 126 into the bunk 124, thereby defining the pet compartments 128 between the partition walls 126 and the end walls 130, 132. In the illustrated embodiment, the pet-configurable bunks 124 in the second column 82 of the pet storage compartment 108 each includes two installed partition walls 126 and defines three respective pet compartments 128. In an embodiment, all of the bunks 74 within the pet storage compartment 108 may be pet-configurable bunks 124. The bunks 124 along the first column 80 of the pet storage compartment 108 do not have any partition walls 126 installed. Therefore, these bunks 124 may be used as resting bunks and/or for storing extra large pet carriers. As described in more detail herein, the partition walls 126 are removable and selectively positionable within the pet-configurable bunks 124 to allow for customization of the number, location, and size of the pet compartments 128 defined within the bunks 124. The pet compartments 128 are configured to receive pets therein. The pets may be contained within enclosed pet storage modules that are loaded into the pet compartments 128. Alternatively, or in addition, some of the pets may be loaded into the pet compartments 128 loose, such that the pet compartments 128 define built-in pet storage modules or pet suites that contain the pets within the compartments 128.

In an embodiment, the rest compartment 106 is configured to allow people to lie down and rest within the bunks 74. The bunks 74 within the rest compartment 106 are optionally not pet-configurable, such that the bunks 74 are not configured to receive removable partition walls for segmenting the bunks 74 into pet compartments. The rest compartment 106 may be provided as a relaxing environment that allows people to sleep or at least relax away from the main passenger cabin 70 shown in FIG. 2. Access to the rest compartment 106 may be restricted to the vehicle crew (e.g., pilots, attendants, mechanics, etc.) only. Alternatively, at least some of the passengers may be permitted to the rest compartment 106, such as passengers within certain classes or sections of the vehicle 10.

The septum wall 110 may insulate the rest compartment 106 from noise, odors, allergens, and the like stemming from the pets within the pet storage compartment 108. For example, the septum wall 110 may have sound-absorbing padding. In an embodiment, the septum wall 110 includes a door 134 that allows a person to cross the septum wall 110 between the pet storage compartment 108 and the rest compartment 106. For example, a person may cross the septum wall 110 from the rest compartment 106 to the pet storage compartment 108, or vice-versa, to exit the overhead cabin 72 if one of the access enclosures 86 is blocked. Although not shown, the door 134 and/or the septum wall 110 may define a window or a one-way mirror that allows a person within the rest compartment 106 to peer into the pet storage compartment 108.

In an embodiment, the rest compartment 106 may be restricted to the vehicle crew only, such that passengers are not permitted into the rest compartment 106 through the corresponding access enclosure 86A attached to the rest compartment 106 or through the door 134 of the septum wall 110. At least some of the passengers may be permitted to enter the pet storage compartment 106 through the other access enclosure 86B. For example, passengers whose pets are held within the pet-configurable bunks 124 and/or passengers whose tickets explicitly designate access to the bunks 124 may be permitted into the pet storage compartment 108. In an embodiment, the partition walls 126 of the pet-configurable bunks 124 are removable such that, during trips in which no pets are stored within the pet-configurable bunks 124, the partition walls 126 may be removed from the bunks 124 to allow passengers and/or crew to lie down within the bunks 124. Furthermore, any pet compartments 128 within the pet-configurable bunks 124 that are not utilized for holding pets may be used as extra storage space for pet-related and/or non-pet-related items, such as strollers, luggage, bags, car seats, coats, hats, umbrellas, and the like. In an alternative embodiment, the overhead cabin 72 does not include the septum wall 110, such that the overhead cabin 72 only defines a single compartment containing one or more pet-configurable bunks 124, instead of two separate compartments.

Figure 4:
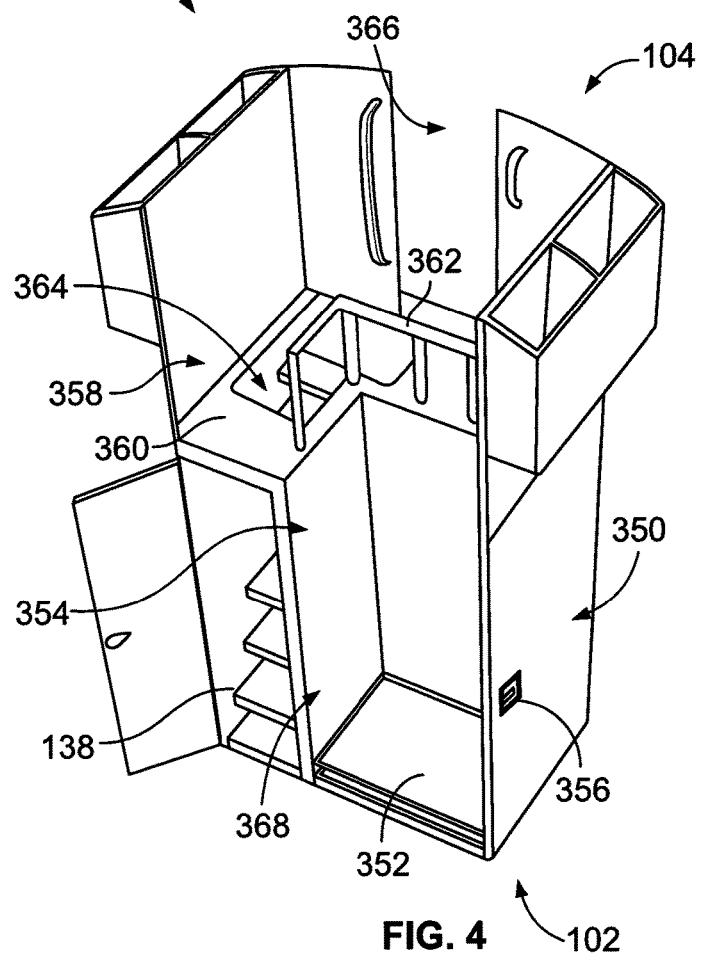
FIG. 4 is a perspective view of one of the access enclosures of the vehicle, according to an embodiment of the present disclosure.

FIG. 4 is a perspective view of one of the access enclosures 86 of the vehicle 10 according to an embodiment of the present disclosure. In the illustrated embodiment, access enclosure 86 includes a mechanical lift 350 that is configured to transport pets and other cargo between the main passenger cabin 70 (FIG. 2) and the overhead cabin 72 (FIG. 3). The mechanical lift 350 may be adjacent to the staircase 138. The mechanical lift 350 includes a platform 352 that is movable vertically within a shaft 354. The platform 352 may be powered by an electric motor (not shown), and operated by a vehicle crew member or passenger using a manual control interface 356, which may include one or more switches, buttons, touchscreens, or the like. A pet storage module 402 (shown in FIG. 7) may be transported from the main passenger cabin 70 at the bottom end 102 of the access enclosure 86 to the overhead cabin 72 at the top end 104 by loading the pet storage module 402 onto the platform 352 when the platform 352 is in a lowered position, as shown in FIG. 4, then activating the mechanical lift 350 to raise the platform 352 to a raised position. The mechanical lift 350 enables the transportation of pets between the main passenger cabin 70 and the overhead cabin 72 without requiring a person to manually carry the pets on the staircase 138 (or ladder). For example, the staircase 138 may be relatively narrow, such that some pets and/or pet storage modules 402 may be too large and/or heavy for a person to comfortably carry up and down the staircase 138.

The access enclosure 86 has an upper level 358 with a floor 360 and a safety rail 362 mounted to the floor 360 to prevent accidental falls into the shaft 354. The floor 360 defines an access opening 364 through which a person climbing the staircase 138 traverses to reach the upper level 358 of the access enclosure 86. When a pet storage module 402 on the platform 352 of the mechanical lift 350 reaches the upper level 358, a person standing on the floor 360 may lift the pet storage module 402 from the platform 352 over the rail 362 and carry the pet storage module 402 through an entryway 366 of the access enclosure 86 into the overhead cabin 72 to one of the pet-configurable bunks 124 (FIG. 3). In an alternative embodiment, the access enclosure 86 may include a safety door that is mounted to the safety rail 362 or to a safety wall to allow for sliding or rolling the pet storage module 402 into and out of the platform 352 instead of lifting the pet storage module 402 over the rail 362. Although not shown, the mechanical lift 350 may include a door that is configured to enclose or at least block an open front end 368 of the shaft 354 when the door is closed to block access to the mechanical lift 350 for safety. For example, the door to the mechanical lift 350 may only be opened when loading and/or unloading pets or other cargo from the platform 352.

Although the example above describes using the mechanical lift 350 to transport a pet storage module 402 between the overhead cabin 72 and the main passenger cabin 70, it is recognized that the mechanical lift 350 may also be used to transport free pets that are not contained within a pet storage module 402 or another housing. Optionally, although not shown, the platform 352 may be configured with built-in frame side walls and optionally a ceiling to define an integrated cage that contacts free pets therein.

Figure 5:
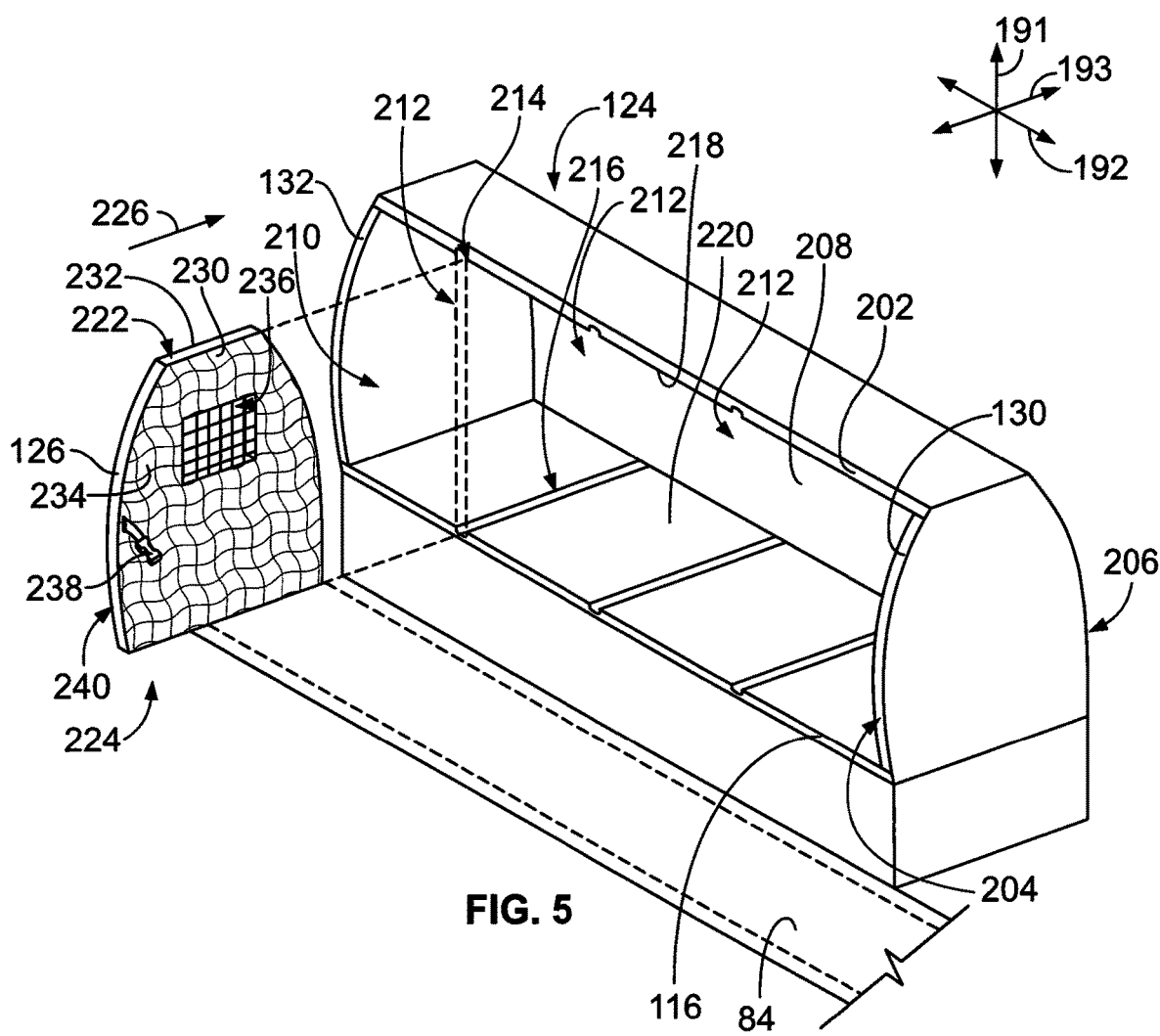
FIG. 5 is a perspective view of a pet-configurable bunk of the overhead cabin shown in FIG. 3, according to an embodiment of the present disclosure.

FIG. 5 is a perspective view of one of the pet-configurable bunks 124 of the overhead cabin 72 shown in FIG. 3 according to an embodiment of the present disclosure. The pet-configurable bunk 124 in the illustrated embodiment may be representative of each of the pet-configurable bunks 124 in the pet storage compartment 108 (FIG. 3) of the overhead cabin 72. The bunk 124 is oriented with respect to a vertical or elevation axis 191, a longitudinal axis 192, and a lateral or depth axis 193. The axes 191-193 are mutually perpendicular. Although the vertical axis 191 appears to extend generally parallel to gravity, it is understood that the axes 191-193 are not required to have any particular orientation with respect to gravity.

The bunk 124 extends a length (along the longitudinal axis 192) from the first end wall 130 to the second end wall 132. The bunk 124 extends a height (along the vertical axis 191) from the base wall 116 to a ceiling 202. The base wall 116 and the ceiling 202 both extend from the first end wall 130 to the second end wall 132. Each of the base wall 116 and the ceiling 202 is connected to both the first and second end walls 130, 132. The bunk 124 extends a width or depth (along the lateral axis 193) from an inboard side 204 to an outboard side 206. The inboard side 204 is disposed laterally between the aisle 84 and the outboard side 206. For example, the inboard side 204 may face towards a bunk 124 on the other side of the aisle 84 (as shown in FIGS. 2 and 3), and the outboard side 206 may face towards one of the fuselage wall members 62 (FIG. 2) that defines an outer wall of the fuselage 10 (FIG. 1). Optionally, one or more of the ceiling 202 or the outboard side 206 of the bunk 124 may be curved to accommodate a curved contour of the fuselage 10, as shown in FIG. 1. The bunk 124 may include a back wall 208 that extends from the ceiling 202 to the base wall 116 and defines the outboard side 206 of the bunk 124. In an alternative embodiment, the ceiling 202 and the back wall 208 may be a unitary and monolithic curved wall extending from the base wall 116 at the outboard side 206 to the inboard side 204 of the ceiling 202 (e.g., instead of two discrete walls coupled together). In the illustrated embodiment, the bunk 124 is open (e.g., defines an opening 210) at the inboard side 204 between the end walls 130, 132 to allow access to the bunk 124.

In an embodiment, the pet-configurable bunk 124 is sized to accommodate an adult person lying down. For example, the length of the bunk 124 between the end walls 130, 130 may be at least five and a half feet, may be at least six feet, or may be at least six and a half feet. Optionally, the length of the bunk 124 may be based on the height of a designated percentage of adults. For example, the bunk 124 may have a length that is longer than the height of at least 90% of adult males or at least 95% of adult males (which would include a larger percentage of adult females). Although not shown in FIG. 5, the bunk 124 may include at least one mattress or cushion that is disposed on the base wall 116 to provide a comfortable, cushioned surface on which a person can lay. The at least one mattress or cushion may be removable to allow for reconfiguring the bunk 124 for pet compartments 128 (shown in FIG. 3).

The illustrated embodiment shows a partition wall 126 poised for loading into the bunk 124 to subdivide the bunk 124 into multiple pet compartments 128. In an embodiment, the partition wall 126 is configured to secure to both the ceiling 202 and the base wall 116. The partition wall 126, when installed, extends from the base wall 116 to the ceiling 202 and subdivides the bunk 124 along the length of the bunk 124 between the end walls 130, 132. Optionally, the installed partition wall 126 may extend fully from the inboard side 204 to the outboard side 206, such that the partition wall 126 engages the back wall 208. The partition wall 126 may have a shape and size that matches or is at least similar to the shapes and sizes of the end walls 130, 132.

In an embodiment, the bunk 124 includes one or more tracks 212 that are configured to receive partition walls 126 to secure the partition walls 126 in fixed positions within the bunk 124. In the illustrated embodiment, each track 212 includes an upper guide slot 214 and a lower guide slot 216. The upper guide slot 214 is located along the ceiling 202, and the lower guide slot 216 is located along the base wall 116. The upper and lower guide slots 214, 216 of each track 212 extend from the inboard side 204 of the bunk 124 towards the outboard side 206. In an embodiment, the upper and lower guide slots 214, 216 extend parallel to each other and parallel to the lateral (or depth) axis 193. In each track 212, the upper guide slot 214 aligns with the respective lower guide slot 216 such that the two guide slots 214, 216 are coplanar along a plane that extends along the vertical axis 191 and the lateral axis 193. In the illustrated embodiment, the upper guide slots 214 of the tracks 212 are recessed within the ceiling 202 from an interior surface 218 of the ceiling 202 that faces the base wall 116. Similarly, the lower guide slots 216 are recessed within the base wall 116 from an interior surface 220 of the base wall 116 that faces the ceiling 202. For example, the upper and lower guide slots 214, 216 may be grooves or channels along the ceiling 202 and base wall 116, respectively. In an alternative embodiment, the upper and lower guide slots 214, 216 may include rails or ribs that project beyond the respective interior surfaces 218, 220 of the ceiling 202 and base wall 116. For example, each of the upper guide slots 214 may be defined between two parallel ribs that extend a short distance (e.g., one to four centimeters) from the interior surface 218 of the ceiling 202.

As the partition wall 126 is loaded into one of the tracks 212, an upper end 222 of the partition wall 126 is received within the upper guide slot 214 of the track 212, and a lower end 224 of the partition wall 126 is received within the lower guide slot 216. The guide slots 214, 216 may have widths along the longitudinal axis 192 that are slightly greater than corresponding thicknesses of the upper and lower ends 222, 224 of the partition wall 126 to allow the partition wall 126 to slide into the track 212 in a loading direction 226 from the inboard side 204 towards the outboard side 206. The loading direction 226 may be parallel to the lateral axis 193. The partition wall 126 may be held in place within the track 212 via friction (e.g., an interference fit), or via a fastener, such as a clip or screw. In order to selectively remove the partition wall 126 from the bunk 124 to reconfigure the bunk 124, the partition wall 126 may slide out of the track 212 in a direction that is opposite the loading direction 226.

The bunk 124 includes three tracks 212 in the illustrated embodiment. The three tracks 212 are spaced apart from each other along the length of the bunk 124 between the end walls 130, 132. The three tracks 212 are also spaced apart from the end walls 130, 132. In other embodiments, the bunk 124 may include more or less than three tracks 212. Optionally, the tracks 212 may be uniformly spaced apart from each other and from the end walls 130, 132. In the illustrated embodiment, the three tracks 212 allow the bunk 124 to define up to four pet compartments 128 (FIG. 3), which occurs when each of the three tracks 212 includes an installed partition wall 126. The bunk 124 may include multiple tracks 212 to enable selective configuration of different sizes and locations of pet compartments 128 (FIG. 3) within the bunk 124.

Figure 6A:
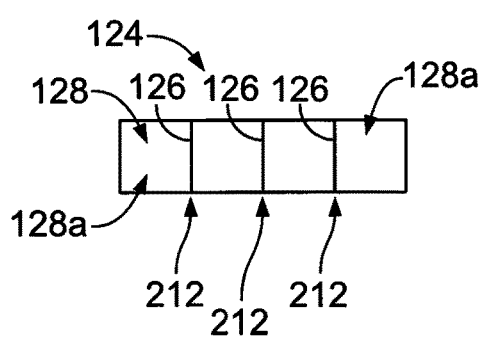
FIG. 6A illustrates a front view of the pet-configurable bunk of FIG. 5 in a first pet configuration according to an embodiment.
Figure 6B:
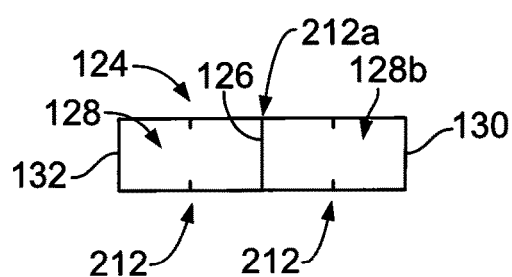
FIG. 6B illustrates a front view of the pet-configurable bunk of FIG. 5 in a second pet configuration according to an embodiment.
Figure 6C:
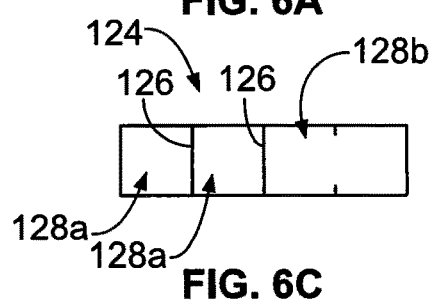
FIG. 6C illustrates a front view of the pet-configurable bunk of FIG. 5 in a third pet configuration according to an embodiment.
Figure 6D:
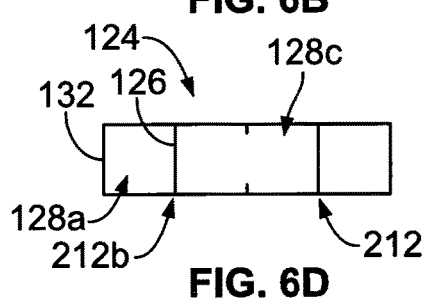
FIG. 6D illustrates a front view of the pet-configurable bunk of FIG. 5 in a fourth pet configuration according to an embodiment.

FIGS. 6A-6D illustrate front views of the pet-configurable bunk 124 of FIG. 5 in different pet configurations according to an embodiment. The front views show the inboard side 204 (FIG. 5) of the bunk 124. For example, FIG. 6A illustrates the bunk 124 in a first pet configuration; FIG. 6B illustrates the bunk 124 in a second pet configuration; FIG. 6C illustrates the bunk 124 in a third pet configuration; and FIG. 6D illustrates the bunk 124 in a fourth pet configuration.

The bunk 124 in the first pet configuration shown in FIG. 6A includes three partition walls 126 installed within the bunk 124 such that all three of the tracks 212 hold a corresponding partition wall 126. The bunk 124 defines four pet compartments 128 that are configured to receive pets, pet carriers, and/or other cargo items, such as pet-related supplies, passenger items, vehicle supplies, etc. The four pet compartments 128 may all have a common small size, referred to as small pet compartments 128a.

Turning to FIG. 6B, the bunk 124 in the second pet configuration includes a single partition wall 126 installed into the bunk 124 at a middle track 212a of the three tracks 212. The bunk 124 defines two pet compartments 128 of equal size, which are larger than the small pet compartments 128a in FIG. 6A. Each of the two pet compartments 128 is extends a length between the partition wall 126 and a different corresponding one of the end walls 130, 132 of the bunk 124. The pet compartments 128 in FIG. 6B are referred to as large pet compartments 128b. The large pet compartments 128b may be used for storing larger pets and pet carriers, or for allowing smaller pets more room for moving around that afforded by the small pet compartments 128a.

With reference to FIG. 6C, the bunk 124 in the third pet configuration includes a two partition walls 126. As a result, the bunk 124 defines two small pet compartments 128a and one large pet compartment 128b. Finally, in FIG. 6D, the bunk 128 in the fourth pet configuration includes a single partition wall 126 installed within an outer track 212b of the three tracks 212 that is adjacent to the second end wall 132. As a result, the bunk 124 defines one small pet compartment 128a and one extra-large pet compartment 128c that is larger than the large pet compartments 128b shown in FIGS. 6B and 6C. The extra-large pet compartment 128c may accommodate large pets and pet carriers, and provides a greater amount of room for the pets than the large pet compartments 128b.

In other embodiments, the bunk 124 may include more than three tracks 212, to enable additional configuration options for storing pets within the bunk 124.

Referring now back to FIG. 5, the partition wall 126 has a first side 230 and a second side 232 that is opposite the first side 230. The first and second sides 230, 232 extend from the upper end 222 to the lower end 224. The partition wall 126 may have a rigid structure. For example, the partition wall 126 may have a construction that includes one or more frames or panels of metal, plastic, and/or composite materials.

The partition wall 126 may include one or more features or materials for accommodating pets within the bunk 124. For example, the partition wall 126 in the illustrated embodiment includes a sound-absorbing padding 234 that at least partially covers the first and second sides 230, 232. The partition wall 126 may also include one or more vent openings 236 extending through the partition wall 126 (from the first side 230 to the second side 232). A single vent opening 236 is shown in FIG. 5. The vent opening 236 provides air flow across the partition wall 126. The vent opening 236 is optionally see-through to allow a pet in one pet compartment 128 to view into an adjacent pet compartment 128. In FIG. 5, the sound-absorbing padding 234 covers the entire first side 230 except for the area occupied by the vent opening 236. Although not shown, the sound-absorbing padding 234 along the second side 232 may mirror the sound-absorbing padding 234 along the first side 232. The sound-absorbing padding 234 may be a foam material that optionally has a contoured surface design, such as an egg-crate pattern. The sound-absorbing padding 234 may dampen pet noises, such as barks, such that passengers in the main passenger cabin 70 (FIG. 2) do not hear the pets in the overhead cabin 72 (FIG. 3).

In the illustrated embodiment, the partition wall 126 includes an attached latch member 238 that extends from the first side 230. The latch member 238 is disposed proximate to an inboard side 240 of the partition wall 126 in the illustrated embodiment, but may have other locations in other embodiments. The latch member 238 may be configured to removably engage and latch to a complementary latch member attached to a pet storage module 402 (shown in FIG. 7) to secure the pet storage module 402 within a pet compartment 128 along the first side 230 of the partition wall 126. For example, the latch member 238 may be used to limit movement of the pet storage module 402 relative to the partition wall 126 (and to the bunk 124 in general). The latch member 238 may be used to tether a pet storage module 402 to the bunk 124, preventing the pet storage module 402 from falling out of the bunk 124 through the opening 210 at the inboard side 204. The latch member 238 in the illustrated embodiment is a female housing of a side-releasable buckle assembly, but may have different shapes for other types of latching assemblies in other embodiments. Optionally, the partition wall 126 may include more than one latch member 238 attached to the first side 230. Although not shown in FIG. 5, the partition wall 126 may also include one or more latch members 238 that are attached to the second side 232 for securing a pet storage module 402 within a pet compartment 128 along the second side 232.

Figure 7:
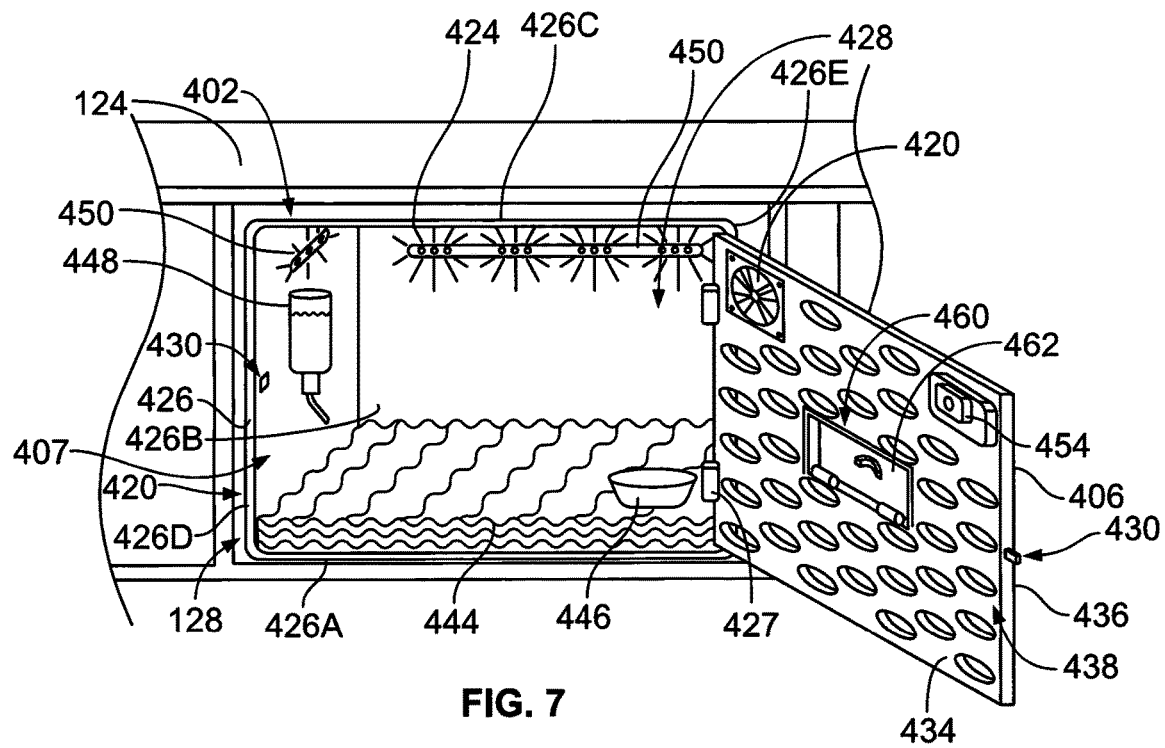
FIG. 7 is a perspective view of a pet storage module held within a pet compartment of the pet-configurable bunk, according to an embodiment of the present disclosure.

FIG. 7 is a perspective view of a pet storage module 402 held within a pet compartment 128 of the pet-configurable bunk 124 according to an embodiment of the present disclosure. The pet storage module 402 is a pet housing or carrier that is configured to contain a pet therein. The pet storage module 402 is releasably held within the pet compartment 128 during a trip of the vehicle 10 (shown in FIG. 1). The following description of the pet storage module 402 may be applicable to pet storage modules 402 of different sizes.

The pet storage module 402 includes a housing 424 that extends from a front end 420 to an opposite rear end (not shown). The housing 424 includes multiple module walls 426 that define a cavity 428 that receives one or more pets therein. The housing 424 defines an opening to the cavity 428 at the front end 420. A door 406 is pivotably coupled to the housing 424 and configured to enclose the opening 407 when the door 406 is in a closed position. The module walls 426 include a bottom wall 426A on which the pet stands or lays, a rear wall 426B opposite the door 406, a top wall 426C, and two side walls 426D, 426E. The housing 424 is connected to the door 406 via hinges 427. The door 406 may be releasably secured in the closed position using a locking mechanism 430. When the door 406 is closed, the cavity 428 is fully enclosed, preventing the pet from escaping the pet storage module 402. The module walls 426 may be at least partially covered by a sound-absorbing padding for muffling sounds emitted from the one or more pets within the cavity 428.

The door 406 of the pet storage module 402 may be see-through. For example, the door 406 may be at least partially transparent or translucent to allow the pet within the cavity 428 to see out of the pet storage module 402, which may reduce the anxiety of the pet. The see-through door 406 may also allow the pet owner to view the pet within the cavity 428. The door 406 may be composed of a glass or a polymer. In at least one other embodiment, the door 406 may be a cage, screen, or mesh. The door 406 includes an inner surface 434 and an opposite outer surface 436. In an embodiment, the door 406 includes air holes 438 that extend through the door 406 between the inner and outer surfaces 434, 436 to provide ventilation for the pet within the cavity 428. The air holes 438 may have various sizes, with dimensions (e.g., diameters) ranging from centimeters down to micrometers.

The pet storage module 402 may have several amenities designed to increase the comfort level of the pet and the pet's owner. For example, the pet storage module 402 may include a padded cushion 444 on which the pet can lay. The cushion 444 may have multiple different layers composed of different types of materials, such as a sound-absorbing layer that includes a foam, rubber, or elastomeric material, a moisture-absorbing layer that includes an absorbent fabric material, and a cushioning layer that is a rubber or rubber-like pad.

The pet storage module 402 may include an electric fan 440 for ventilation. The electric fan 440 is mounted to the door 406 in the illustrated embodiment. The pet storage module 402 may include a bowl 446 for water and/or food, a water dispenser 448, dimmable lights 450, and/or the like. The pet storage module 402 optionally includes a camera 454 positioned to acquire image data (e.g., still images and/or video) of the pet within the cavity 428.

The door 406 optionally may include a window 460 with a movable panel 462 that can be slid or pivoted along hinges relative to the door 406 between a closed position and an open position. The panel 462 in the closed position covers the window 460 and prevents physical access to the pet through the window 460. The panel 462 in the open position exposes the window 460 and allows physical access to the pet within the cavity 428 without opening the door 406. For example, the window 460 can be sized to allow a person's hand to fit through the window 460 for feeding or petting the pet through the door 406.

Although not shown, the pet storage module 402 optionally includes one or more handles that allow a person to pick up the pet storage module 402. Optionally, larger pet storage modules 402 may also include wheels located under the bottom wall 426A that allow the modules 402 to roll.

Although various different amenities are shown in FIG. 7, it is understood that the pet storage module 402 in other embodiments may not include all of the amenities shown and/or may include additional amenities that are not shown in FIG. 7.

Figure 8:
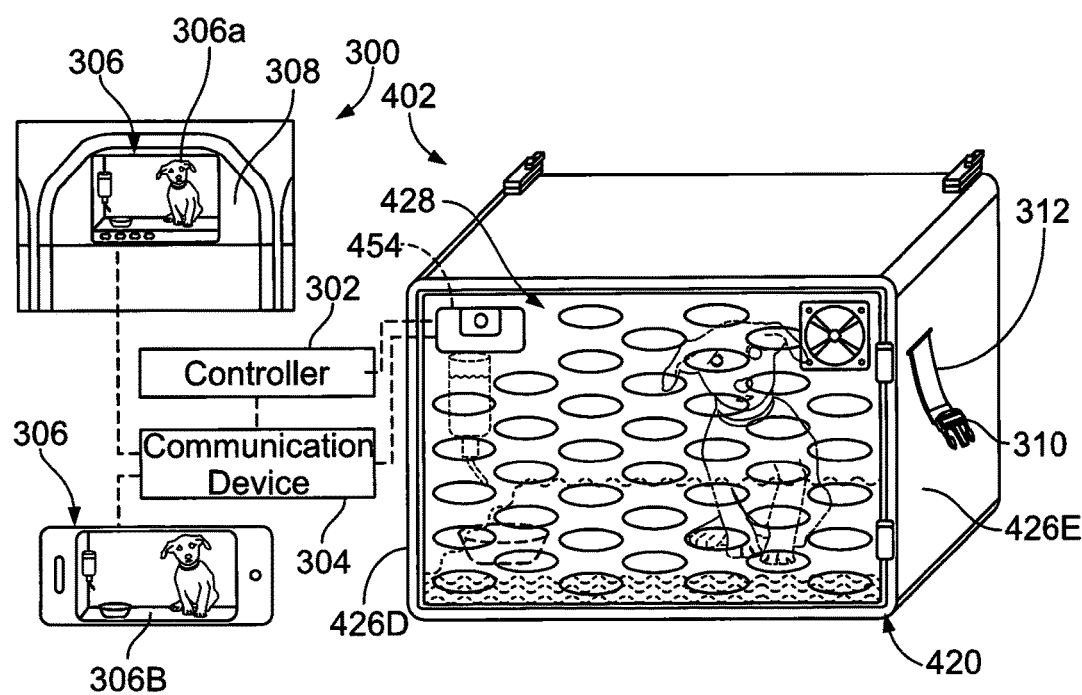
FIG. 8 is a schematic representation of an image communication system for communicating image data of the pet in the pet storage module, according to an embodiment of the present disclosure.

FIG. 8 is a schematic representation of an image communication system 300 for communicating image data of the pet in the pet storage module 402 according to an embodiment of the present disclosure. The communication system 300 includes the camera 454 mounted to the pet storage module 402, a controller 302 including one or more processors, a communication device 304, and various display devices 306 for displaying the image data to one or more passengers on the vehicle. Additional display devices (not shown) may be used to display the image data to vehicle crew members.

The controller 302 is configured to control the operation of the image communication system 300. The controller 302 includes and/or represents one or more hardware circuits or circuitry that include, are connected with, or that both include and are connected with one or more processors, controllers, and/or other hardware logic-based devices. The controller 302 may include a central processing unit (CPU), one or more microprocessors, a graphics processing unit (GPU), or any other electronic component capable of processing inputted data according to specific logical instructions. For example, the controller 302 may execute instructions stored on a tangible and non-transitory computer readable medium.

In an embodiment, the camera 454 is positioned to have a field of view that includes the pet within the cavity 428. The camera 454 may be a digital camera that is operatively connected to the controller 302 via a wired or wireless connection. The controller 302 may communicate with the camera 454 by transmitting electrical signals to control when the camera 454 acquires image data of the pet. The controller 302 may also control various properties of the image data acquisition, such as whether the camera 454 acquires still images or video, a frequency at which the camera 454 acquires the image data, a zoom angle of the camera 454, and the like.

The controller 302 is operatively connected to the communication device 304 (via a wired or wireless connection) for communicating the acquired image data of the pet to one or more of the display devices 306. The communication device 304 may include hardware such as a transceiver, receiver, transmitter, and/or the like, and associated circuitry (e.g., antennas) for wirelessly communicating (e.g., transmitting and/or receiving) with the display devices 306. The communication device 304 may also be configured to wirelessly communicate with a server or the like. The communication device 304 may be configured to establish a bi-directional communication link with a display device 306 using protocol firmware that may be stored in a tangible and non-transitory computer readable medium. For example, the protocol firmware may provide network protocol syntax for the communication device 304 to assemble data packets, establish and/or partition data received along the bi-directional communication links, and/or the like.

The display devices 306 in the illustrated embodiment include a headrest touch-screen monitor 306A on the back of a passenger seat 308 and a mobile device 306B, which may be a smart phone or tablet. In an embodiment, a passenger (e.g., such as, but not necessarily limited to, the owner of the pet within the pet storage module 402) may use one of the display devices 306 to initiate a communication link with the camera 454 mounted to the pet storage module 402. The controller 302 may be used to verify and provide access to the acquired image data. Upon establishment of the communication link, the image data acquired by the camera 454 may be communicated via the communication device 304 to one or more of the display devices 306 for the passenger(s) viewing the display device(s) 306 to be able to see a live feed of the pet. By accessing the live feed using the display device(s) 306, a passenger may be able to view the pet from a remote location within the interior cabin. For example, the passenger may be able to view the pet even though the passenger is seated in an assigned seat 308 remote from the pet-configurable bunk 124 (FIG. 7) that holds the pet storage module 402.

In the illustrated embodiment, the pet storage module 402 includes a latch member 310 secured via a strap 312 to the side module wall 426E of the pet storage module 402. The latch member 310 is located at or proximate to the front end 420 of the pet storage module 402. In the illustrated embodiment, the latch member 310 is a male housing of a side-releasable buckle assembly that is configured to be received into a receptacle of a complementary female latch member. For example, with reference to FIG. 5, the male latch member 310 (e.g., second latch member 310) in the illustrated embodiment is configured to releasable connect to the latch member 238 (e.g., first latch member 238) that is attached to the second side 232 of the partition wall 126. When the latch member 310 is coupled to the latch member 238, the pet storage module 402 is secured within the pet compartment 128 (FIG. 7) with only a limited amount, of any, of permitted movement relative to the pet compartment 128. The strap 312 may be adjustable to allow for modifying the tension between the partition wall 126 and the pet storage module 402. Although not shown, the pet storage module 402 may also include a latch member 310 attached to the side module wall 426D. It is recognized that the pet storage module 402 and the pet-configurable bunk 124 (FIG. 5) in other embodiments may have different types, numbers, and locations of latching mechanisms for securing the pet storage module 402 within the pet compartment 128. For example, the latching mechanisms may include push-push latching mechanisms, push-pull latching mechanisms, hook-and-loop fasteners, or the like.

Figure 9:
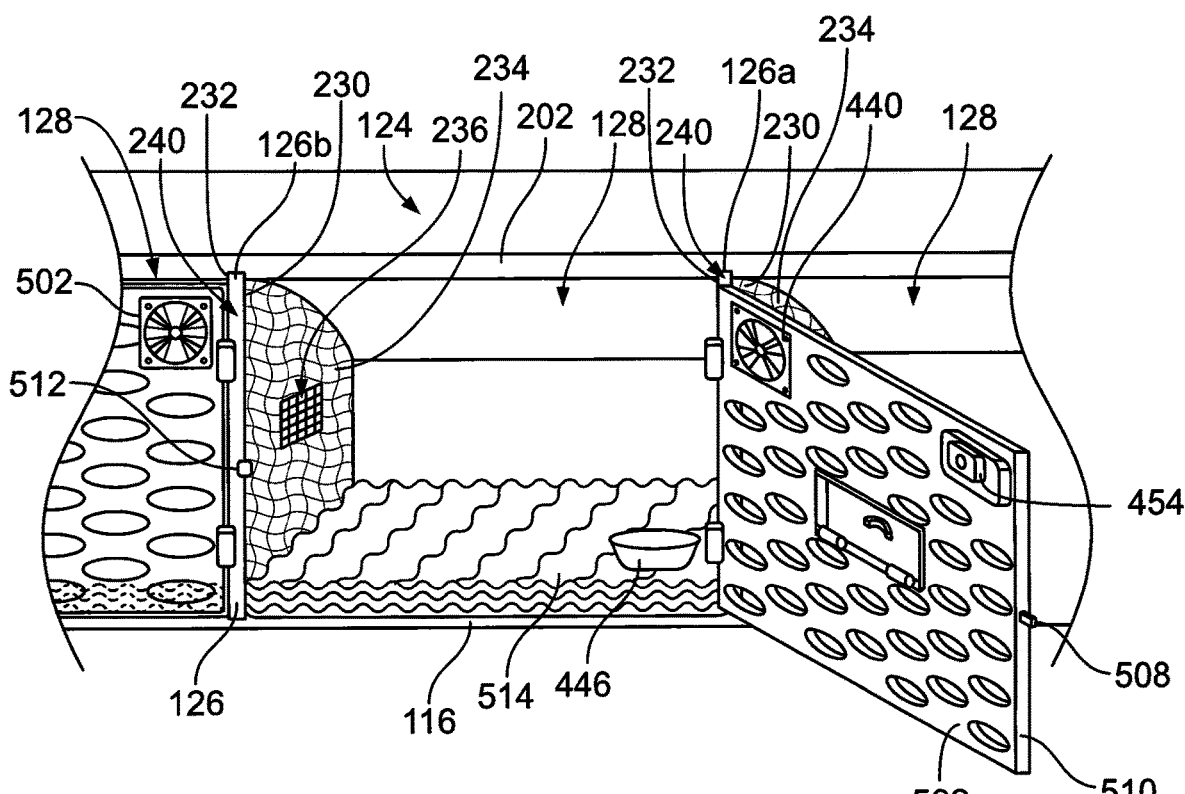
FIG. 9 is a perspective view of a portion of the pet-configurable bunk according to another embodiment.

FIG. 9 is a perspective view of a portion of the pet-configurable bunk 124 according to another embodiment. In the illustrated embodiment, at least some of the pet compartments 128 of the bunk 124 are configured to receive free, unconstrained pets therein. For example, the pet compartments 128 receive pets that are not housed within pet carriers like the pet storage module 402 shown in FIGS. 7 and 8. In the illustrated embodiment, the pet compartments 128 define built-in pet suites, providing many of the same amenities offered by the pet storage module 402 shown in FIG. 7.

The illustrated portion of the pet-configurable bunk 124 shows two partition walls 126 secured to the ceiling 202 and the base wall 116. The two partition walls 126 define portions of three pet compartments 128, with one of the pet compartments 128 between the two partition walls 126 and the other two pet compartments 128 along outer sides of the partition walls 126. The partition walls 126 each have a respective door 502 that is hingedly mounted to the corresponding partition wall 126 at the inboard side 240 thereof. The doors 502 are pivotable relative to the bunk 124 between open and closed positions. Each of the doors 502, when closed, extends from the respective partition wall 126 across one of the pet compartments 128 along a side of the respective partition wall 126. In the illustrated embodiment, the doors 502 extend across the pet compartments 128 that are along the second side 232 of each of the partition walls 126, but the doors 502 may extend the other direction in other embodiments. The doors 502 in the open position allow pets to be loaded and unloaded from the pet compartments 128, and the doors 502 in the closed positions block pets that are within the pet compartments 128 from exiting the pet compartments 128.

The doors 502 may be similar to the door 406 shown in FIG. 7. For example, the doors 406 may each have a camera 454 positioned to acquire image data (e.g., still images and/or video) of the pet within the respective pet compartment 128 when the door 502 is closed. The doors 502 may be releasably secured in the closed positions via a locking mechanism. For example, the door 502 mounted to a first of the partition walls 126a includes a bolt 508 extending from a distal edge 510 of the door 502. The second partition wall 126b includes a receiver bracket 512 at the inboard end 240 thereof that is configured to receive and retain the bolt 508 therein when the door 502 is in the closed position to secure the door 502 in the closed position. Optionally, the partition walls 126a, 126b and the doors 502 mounted thereto may be identical. Optionally, the doors 502 may be removable from the partition walls 126, which may enable the same partition walls 126 to be used for transporting free, unconstrained pets, as shown in FIG. 9, and pets that are housed within pet carriers, as shown in FIGS. 7 and 8.

In the illustrated embodiment, the pet compartments 128 also include individual padded cushions 514, which provide comfort for the pets within the compartments 128. The padded cushions 514 may be identical in construction, or at least similar, to the padded cushions 444 (shown in FIG. 7) of the pet storage modules 402 (FIG. 7). The built-in pet suites within the pet compartments 128 may include additional amenities for the pets, such as a water and/or food bowl 446, an electric fan 440, lighting (not shown), and the like. The partition walls 126 may include sound-absorbing padding 234 that covers at least a portion of the sides 230, 232, and optionally may include vent openings 236, like the partition wall 126 shown in FIG. 5.

Figure 10:
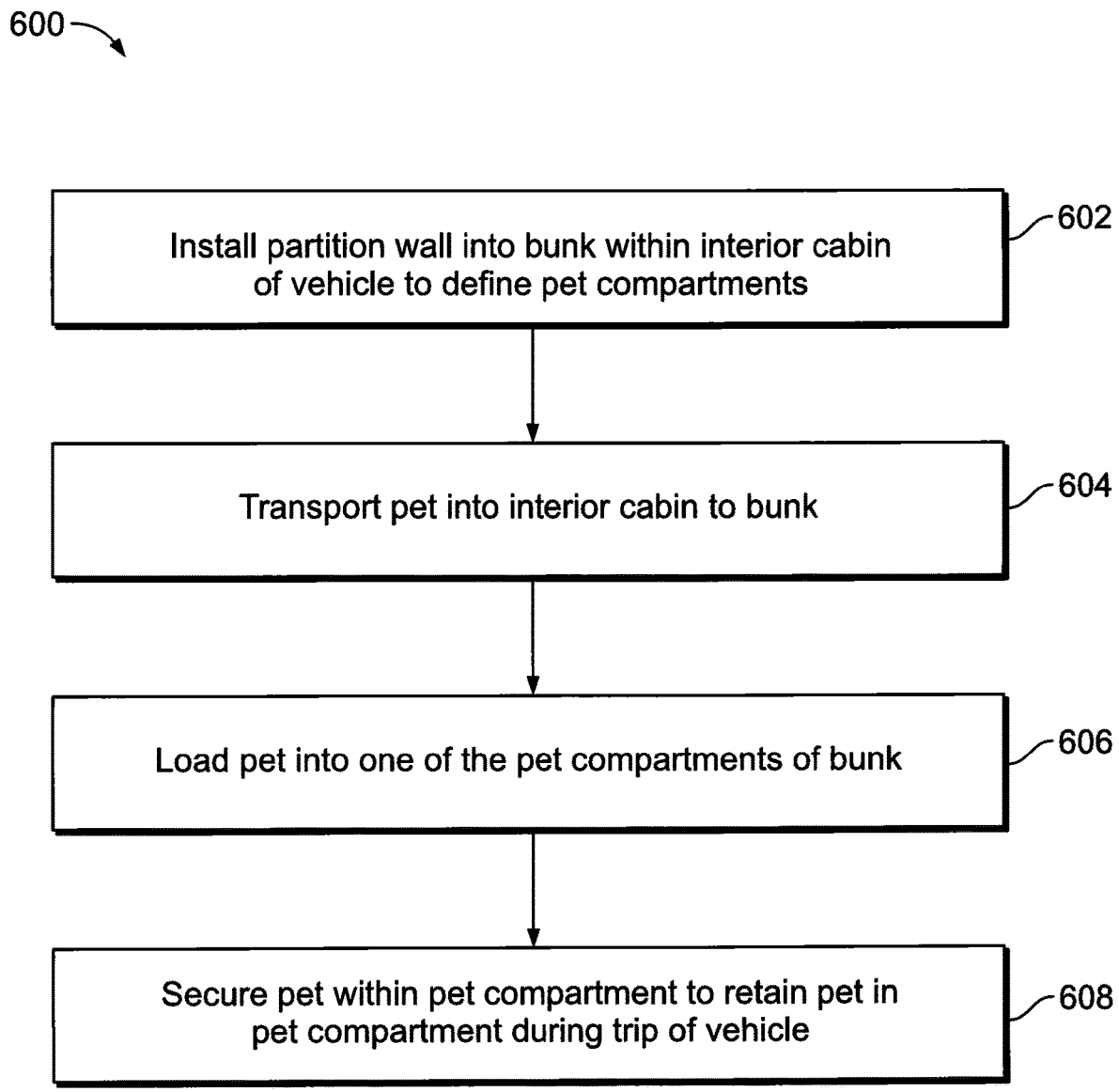
FIG. 10 is a flow chart of a method of transporting pets within an interior cabin of a vehicle, according to an embodiment of the present disclosure.

FIG. 10 is a flow chart of a method 600 of transporting pets within an interior cabin of a vehicle, according to an embodiment of the present disclosure. The method 600 may be performed according to the embodiments described herein with reference to FIGS. 1-9. At 602, a partition wall is installed into a bunk within an interior cabin of a vehicle to define multiple pet compartments within the bunk. For example, the vehicle may be a passenger vehicle, such as an aircraft, a rail vehicle, a sea craft, an automobile, a bus, or the like. The bunk extends a length from a first end wall to a second end wall. The bunk may be configured as a rest bunk that accommodates adult persons, such as passengers or crew members, lying down (at least when no partition walls are installed). The partition wall is installed into a track within the bunk, which secures the partition wall in place relative to the bunk. The track is spaced apart from the first and second end walls. Thus, the partition wall in the track segments or divides the bunk into multiple pet compartments along the length of the bunk. Optionally, multiple partition walls may be installed into different tracks along the length of the bunk to define at least three pet compartments. The bunk is configurable by selecting the number and arrangement of partition walls that are installed within the bunk, thereby customizing the number, locations, and sizes of the pet compartments that are formed.

At 604, a pet is transported into the interior cabin of the vehicle to the bunk. In an embodiment, the interior cabin includes a main passenger cabin and an overhead cabin. The main passenger cabin extends from a floor to a ceiling and has passenger seats mounted to the floor. The overhead cabin is disposed above the ceiling of the main passenger cabin. In an embodiment, the bunk is located within the overhead cabin. The vehicle may include an access enclosure that includes stairs, a ladder, a mechanical lift, and/or the like, for allowing people and cargo to move between the main passenger cabin and the overhead cabin. In an embodiment, the pet is transported to the bunk by carrying the pet, walking the pet, or rolling a container that houses the pet through the main passenger cabin, and using the mechanical lift of the access enclosure to lift the pet to the overhead cabin.

At 606, the pet is loaded into one of the pet compartments of the bunk. For example, the pet may be loaded freely into the pet compartment or the pet may be housed within the pet storage module or carrier, and the pet storage module is loaded into the pet compartment of the bunk. The pet may be loaded into a pet compartment that is associated with that pet, such that the pet compartment has a specific size to accommodate the pet. Optionally, additional pets may be loaded into the same pet compartment with the pet, or into other pet compartments within the bunk.

At 608, the pet is secured within the pet compartment such that the pet is retained within the pet compartment during a trip of the vehicle. In an embodiment in which the pet is free within the pet compartment (e.g., not housed within a pet storage module), the pet may be secured within the pet compartment by closing a door that is mounted to the partition wall. The door extends across a front opening of the pet compartment to block the pet from exiting the pet compartment when the door is closed. In another embodiment in which the pet is housed within a pet storage module, the pet may be secured within the pet compartment during the trip by latching the pet storage module to the partition wall or to other parts of the bunk.

Optionally, the method 600 may also include providing amenities to the pet within the pet compartment during the trip, such as by filling a bowl or a drink dispenser with food or water. The method 600 may also include acquiring image data of the pet via a camera mounted within the interior cabin. The image data acquired by the camera may be displayed on a display device visible to a passenger on the vehicle.

As described herein, embodiments of the present disclosure provide systems and methods of transporting pets onboard a vehicle, such as but not limited to a commercial aircraft. The systems and methods are configured to allow pets to travel within an interior cabin of the vehicle without being stowed underneath passenger seats and without disturbing other passengers. The systems and method are also configured to provide the pets various amenities to reduce stress and anxiety of the pets during the trip. Embodiments of the present disclosure provide systems and methods that occupy an existing rest bunk on the vehicle without requiring removal of passenger seats or other renovations to the interior cabin of the vehicle.

While various spatial and directional terms, such as top, bottom, front, rear, lateral, horizontal, vertical, and the like, may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, the term "controller," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A vehicle comprising:
    a fuselage defining an interior cabin; and
    a bunk within the interior cabin, the bunk having a base wall and a ceiling that extend a length of the bunk from a first end wall to a second end wall,
    wherein the bunk includes one or more removable partition walls that divide the bunk into multiple pet compartments between the first and second end walls configured to contain pets therein, wherein each of the partition walls is removably secured to both the base wall and the ceiling,
    wherein the bunk includes one or more tracks configured to receive the one or more partition walls therein, each of the one or more tracks including an upper guide slot along the ceiling and a lower guide slot along the base wall such that an upper end of a corresponding partition wall is received within the upper guide slot and a lower end of the corresponding partition wall is received within the lower guide slot, the upper and lower guide slots extending from an inboard side of the bunk towards an outboard side of the bunk.

2. The vehicle of claim 1, wherein the bunk includes a plurality of the partition walls spaced apart from each other and spaced apart from the first and second end walls along the length of the bunk to define at least three pet compartments.

3. The vehicle of claim 1, wherein the bunk includes at least three of the tracks, the at least three tracks being spaced apart from each other and spaced apart from the first and second end walls along the length of the bunk to enable selective configuration of sizes and locations of the pet compartments within the bunk.

4. The vehicle of claim 1, wherein each of the pet compartments is configured to receive a corresponding pet storage module therein, the pet storage module including a housing that defines a cavity, the housing defining an opening to the cavity at a front end of the housing, the pet storage module further including a door at the front end that is movable relative to the housing and encloses the opening when in a closed position to retain one or more pets within the cavity of the pet storage module.

5. The vehicle of claim 4, wherein each of the one or more partition walls includes a first latch member attached thereto, the first latch member configured to removably engage a complementary second latch member attached to the corresponding pet storage module to secure the pet storage module within one of the pet compartments.

6. The vehicle of claim 1, wherein the bunk includes a door hingedly mounted to a first partition wall of the one or more partition walls at the inboard side of the bunk, the door movable relative to the first partition wall between an open position and a closed position, wherein the door in the closed position extends from the first partition wall across one of the pet compartments to block a pet from exiting the pet compartment.

7. The vehicle of claim 1, wherein each of the one or more partition walls has a first side and a second side that is opposite the first side, the first and second sides at least partially covered by a sound-absorbing padding.

8. The vehicle of claim 1, wherein each of the one or more partition walls has a first side and a second side that is opposite the first side, one or more of the partition walls defining vent openings that extend from the first side to the second side of the respective partition wall.

9. The vehicle of claim 1, wherein the interior cabin of the vehicle includes a main passenger cabin that extends vertically between a floor and a ceiling and includes passenger seats mounted to the floor, the interior cabin further including an overhead cabin above the ceiling of the main passenger cabin, the bunk disposed within the overhead cabin.

10. The vehicle of claim 9, wherein the interior cabin of the vehicle includes an access enclosure having a staircase extending from the main passenger cabin to the overhead cabin, the access enclosure also including a mechanical lift with a platform that moves vertically between the main passenger cabin and the overhead cabin to transport pets therebetween.

11. A vehicle comprising:
    a fuselage defining a main passenger cabin and an overhead cabin, the main passenger cabin extending vertically from a floor to a ceiling and including passenger seats mounted to the floor, the overhead cabin disposed above the ceiling of the main passenger cabin,
    wherein the overhead cabin includes multiple bunks and an aisle for accessing the bunks, each of the bunks having a respective base wall and a respective ceiling that extend a length of the bunk from a respective first end wall to a respective second end wall,
    wherein at least a first bunk of the multiple bunks includes one or more removable partition walls that divide the first bunk into multiple pet compartments between the first and second end walls, the pet compartments configured to contain pets therein, the first bunk including one or more tracks configured to receive the one or more partition walls therein, each of the one or more tracks including an upper guide slot along the ceiling and a lower guide slot along the base wall such that an upper end of a corresponding partition wall is received within the upper guide slot and a lower end of the corresponding partition wall is received within the lower guide slot, the upper and lower guide slots extending from an inboard side of the first bunk towards an outboard side of the first bunk.

12. A vehicle comprising:
a fuselage defining a main passenger cabin and an overhead cabin, the main passenger cabin extending vertically from a floor to a ceiling and including passenger seats mounted to the floor, the overhead cabin disposed above the ceiling of the main passenger cabin,
wherein the overhead cabin includes multiple bunks and an aisle for accessing the bunks, each of the bunks having a respective base wall and a respective ceiling that extend a length of the bunk from a respective first end wall to a respective second end wall, the overhead cabin including a rest compartment and a pet storage compartment that is separated from the rest compartment by a septum wall, the pet storage compartment containing a first subset of the bunks and the rest compartment containing a second subset of the bunks, the bunks in the second subset configured to accommodate adult persons lying prone,
wherein at least a first bunk in the pet storage compartment includes one or more removable partition walls that divide the first bunk into multiple pet compartments between the first and second end walls, the pet compartments configured to contain pets therein.

13. The vehicle of claim 11, wherein the fuselage includes an access enclosure having a staircase extending from the main passenger cabin to the overhead cabin, the access enclosure also including a mechanical lift with a platform that moves vertically between the main passenger cabin and the overhead cabin to transport pets therebetween.

14. The vehicle of claim 11, wherein the fuselage includes a camera mounted within the overhead cabin and positioned to acquire image data of one or more of the pet compartments of the first bunk, the camera operably connected to a communication device configured to communicate the image data to a display device within the main passenger cabin.

15. A method comprising:
installing one or more removable partition walls into a bunk within an interior cabin of a vehicle, the bunk extending a length between first and second end walls, the one or more partition walls installed into tracks within the bunk that are spaced apart from the first and second end walls, wherein the one or more partition walls dividing the bunk into multiple pet compartments along the length of the bunk, each of the tracks including an upper guide slot configured to receive an upper end of a corresponding partition wall and a lower guide slot configured to receive a lower end of the corresponding partition wall, the upper and lower guide slots extending from an inboard side of the bunk towards an outboard side of the bunk; and
securing a pet within one of the pet compartments such that the pet is retained within the pet compartment during a trip of the vehicle.

16. The method of claim 15, wherein the interior cabin of the vehicle includes a main passenger cabin and an overhead cabin that is disposed above a ceiling of the main passenger cabin, wherein the method further comprises lifting the pet from the main passenger cabin to the overhead cabin using a mechanical lift.

17. The method of claim 15, wherein the pet is contained within a pet storage module that includes a housing and a door, wherein securing the pet within the corresponding pet compartment includes coupling a first latch member that is fixed to one of the partition walls to a complementary second latch member that is fixed to the housing of the pet storage module to retain the pet storage module within the pet compartment.

18. The method of claim 15, wherein a first partition wall of the one or more partition walls includes a door that is mounted to an inboard side of the first partition wall, the door movable relative to the first partition wall between an open position and a closed position, wherein securing the pet within the corresponding pet compartment includes closing the door and locking the door in the closed position such that the door extends across the pet compartment and blocks the pet from exiting the pet compartment.

19. The vehicle of claim 11, wherein the first bunk includes a door hingedly mounted to a first partition wall of the one or more partition walls at the inboard side, wherein the door in a closed position extends from the first partition wall across one of the pet compartments to block a pet from exiting the pet compartment.

20. The vehicle of claim 11, wherein the overhead cabin includes a rest compartment and a pet storage compartment that is separated from the rest compartment by a septum wall, the pet storage compartment containing a first subset of the bunks including the first bunk, the rest compartment containing a second subset of the bunks, the bunks in the second subset configured to accommodate adult persons lying prone.

* * * * *